United States Patent
Torikai et al.

(10) Patent No.: US 9,063,300 B2
(45) Date of Patent: Jun. 23, 2015

(54) ELECTRICAL-OPTICAL HYBRID CONNECTOR AND RECEPTACLE THEREOF

(75) Inventors: Toshitaka Torikai, Tokyo (JP); Mitsuaki Kazou, Tokyo (JP); Masayuki Shiratori, Tokyo (JP); Takayoshi Yamauchi, Tokyo (JP); Shuichi Aihara, Tokyo (JP); Satoshi Kai, Tokyo (JP); Yuichi Koreeda, Tokyo (JP); Naoki Katagiyama, Tokyo (JP)

(73) Assignee: JAPAN AVIATION ELECTRONICS INDUSTRY LIMITED, Tokyo (JP)

( * ) Notice: Subject to any disclaimer, the term of this patent is extended or adjusted under 35 U.S.C. 154(b) by 326 days.

(21) Appl. No.: 13/813,514

(22) PCT Filed: Jun. 28, 2011

(86) PCT No.: PCT/JP2011/064806
§ 371 (c)(1),
(2), (4) Date: Jan. 31, 2013

(87) PCT Pub. No.: WO2012/029396
PCT Pub. Date: Mar. 8, 2012

(65) Prior Publication Data
US 2013/0129284 A1      May 23, 2013

(30) Foreign Application Priority Data
Aug. 31, 2010 (JP) ................... 2010-194625

(51) Int. Cl.
*G02B 6/38* (2006.01)

(52) U.S. Cl.
CPC ............ *G02B 6/3807* (2013.01); *G02B 6/3817* (2013.01); *G02B 6/3849* (2013.01); *G02B 6/3853* (2013.01); *G02B 6/3885* (2013.01); *G02B 6/3897* (2013.01)

(58) Field of Classification Search
None
See application file for complete search history.

(56) References Cited

U.S. PATENT DOCUMENTS 6,464,517 B1    10/2002    Jones
7,561,763 B2 *   7/2009    Kiani et al. .................... 385/14

(Continued)

FOREIGN PATENT DOCUMENTS

CN        201429716          3/2010
CN        201429716 Y  *     3/2010

(Continued)

OTHER PUBLICATIONS

Taiwan Office Action, dated Nov. 18, 2013 along with an English language translation thereof.

(Continued)

*Primary Examiner* — Michelle R Connelly
(74) *Attorney, Agent, or Firm* — Greenblum & Bernstein, P.L.C.

(57) ABSTRACT

A receptacle of an electrical-optical hybrid connector including a plug having an insertion fitting part and the receptacle having a housing space that receives the insertion fitting part includes an optical connection part disposed in a space in communication with the housing space, and an electrical connection part disposed in front of the optical connection part, a shutter that is opened when the receptacle and the plug are connected to each other is provided in front of the optical connection part of the receptacle, and the optical connection part of the receptacle moves forward in association with the shutter when the shutter is opened, and moves rearward in association with the shutter when the shutter is closed.

23 Claims, 13 Drawing Sheets

(56) References Cited

U.S. PATENT DOCUMENTS

| | | | |
|---|---|---|---|
| 7,798,726 B2 | 9/2010 | Sabo | |
| 8,388,241 B2 * | 3/2013 | He et al. | 385/92 |
| 8,491,200 B2 * | 7/2013 | He et al. | 385/94 |
| 8,708,579 B2 * | 4/2014 | Shiratori et al. | 385/93 |
| 8,721,189 B2 * | 5/2014 | Wu | 385/77 |
| 2002/0001437 A1 * | 1/2002 | Yamaguchi | 385/75 |
| 2002/0122633 A1 | 9/2002 | Uchida | |
| 2010/0046891 A1 * | 2/2010 | Sabo | 385/74 |
| 2010/0254667 A1 | 10/2010 | He et al. | |
| 2010/0290743 A1 * | 11/2010 | Liao et al. | 385/75 |
| 2011/0229083 A1 * | 9/2011 | Dainese Júnior et al. | 385/74 |
| 2011/0229094 A1 * | 9/2011 | Isenhour et al. | 385/92 |
| 2012/0063726 A1 * | 3/2012 | Wu | 385/88 |
| 2013/0148930 A1 * | 6/2013 | Ko et al. | 385/88 |

FOREIGN PATENT DOCUMENTS

| | | | |
|---|---|---|---|
| CN | 201497821 | | 6/2010 |
| EP | 2202551 | | 6/2010 |
| JP | 2002-260774 | | 9/2002 |
| JP | 2004-198504 | | 7/2004 |
| JP | 2010-050092 | | 3/2010 |
| JP | 2010-245040 | | 10/2010 |
| TW | 1220584 | | 8/2004 |
| TW | 1220584 B | * | 8/2004 |
| TW | 201014087 | | 4/2010 |
| TW | 201014087 A | * | 4/2010 |

OTHER PUBLICATIONS

China Office action, mail date is Sep. 23, 2014, with English language translation.

International Search Report, mail date Aug. 2, 2011.

* cited by examiner

ELECTRICAL-OPTICAL HYBRID CONNECTOR AND RECEPTACLE THEREOF

TECHNICAL FIELD

The present invention relates to an electrical-optical hybrid connector used for both optical connection and electrical connection.

BACKGROUND ART

FIGS. 1A, 1B and 1C show a configuration of an electrical-optical hybrid connector described in Patent literature 1 as an example of an electrical-optical hybrid connector of this type comprising a plug and a receptacle. FIG. 1A shows the plug, FIG. 1B shows the plug partially disassembled, and FIG. 1C shows the receptacle.

A plug 10 has an insulating main body 11 and a plug terminal mounted on the insulating main body 11. The insulating main body 11 has a base part 13 having a fitting surface 13a and a tongue piece 14 extending forward from the base part 13. A through hole for housing an optical fiber is formed in the base part 13. A lens 15 is housed in the through hole and disposed so as to protrude from the fitting surface 13a.

A metal shell 12 is disposed to surround the insulating main body 11. An upper housing space 16 and a lower housing space 17 are formed between the tongue piece 14 and a top plate of the metal shell 12 and between the tongue piece 14 and a bottom plate of the metal shell 12, respectively.

The plug terminal includes a plurality of first terminals and a plurality of second terminals. The first terminals 18 are mounted on the upper surface of the tongue piece 14 and are exposed in the upper housing space 16. Although not visible in FIG. 1B, the second terminals are mounted on the lower surface of the tongue piece 14 and are exposed in the lower housing space 17.

A receptacle (socket) 20 has an insulating main body 21, a socket terminal mounted on the insulating main body 21, and a metal shell 22 that covers the insulating main body 21. The insulating main body 21 has a housing space 23 for housing the plug 10, a base part 24, and a first tongue piece 25 extending forward from the base part 24.

The socket terminal includes a plurality of first terminals and a plurality of second terminals. First terminals 26 are disposed on the lower surface of the first tongue piece 25. The insulating main body 21 has a second tongue piece 27 extending forward from the base part 24 disposed in parallel with the first tongue piece 25. Second terminals 28 are disposed on the upper surface of the second tongue piece 27.

A through hole is formed through the first tongue piece 25 and the base part 24. A lens 29 is held in the through hole and positioned at a tip end part of the first tongue piece 25. An optical fiber is housed behind the lens 29 in the through hole.

The receptacle 20 has two, upper and lower, sets of the housing space 23, the first tongue piece 25, the second tongue piece 27, the first terminals 26 and the second terminals 28.

With the electrical-optical hybrid connector comprising the plug 10 and the receptacle 20, when the plug 10 is inserted into the receptacle 20, the first terminals 18 of the plug 10 are connected to the first terminals 26 of the receptacle 20, and the second terminals of the plug 10 are connected to the second terminals 28 of the receptacle 20. In addition, the lens 15 of the plug 10 is inserted into the through hole of the receptacle 20, in which the lens 29 is positioned, to face the lens 29 and establish an optical connection (transmission of optical signals).

PRIOR ART LITERATURE

Patent Literature

Patent literature 1: Japanese Patent Application Laid-Open No. 2010-50092

SUMMARY OF THE INVENTION

Problems to be Solved by the Invention

In a conventional electrical-optical hybrid connector that can be used to establish both an optical connection and an electrical connection, the optical connection part and the electrical connection part are disposed in the same space. As a result, there is a problem that a metal abrasion powder produced by the rubbing of metal terminals when the electrical connection is established is likely to adhere to the optical connection part. For example, if the metal abrasion powder adheres to a lens or the like, the optical coupling efficiency can be substantially degraded.

In addition, although the optical connection part of the receptacle is exposed at the front of the receptacle as shown in FIG. 1C and therefore can be readily cleaned, the optical connection part of the plug is located in the back of the space surrounded by the shell as shown in FIG. 1B and therefore is difficult to be cleaned. Thus, there is a problem that if a metal abrasion powder or the like adheres to the optical connection part, the metal abrasion powder or the like can hardly be removed.

In view of the problems described above, an object of the present invention is to provide an electrical-optical hybrid connector that prevents a metal abrasion powder produced by the rubbing of terminals for electrical connection from adhering to an optical connection part, thereby preventing a degradation of the optical coupling efficiency, and provide a receptacle of the electrical-optical hybrid connector.

Means to Solve the Problems

A receptacle of an electrical-optical hybrid connector comprising a plug having an insertion fitting part and the receptacle having a housing space that receives the insertion fitting part of the plug comprises an optical connection part disposed in a space in communication with the housing space, and an electrical connection part disposed in front of the optical connection part in the housing space, a shutter that is opened when the receptacle and the plug are connected to each other is provided in front of the optical connection part, and the optical connection part moves forward in association with the shutter when the shutter is opened, and moves rearward in association with the shutter when the shutter is closed. The plug has an optical connection part disposed at a front end of the insertion fitting part and an electrical connection part disposed behind the optical connection part.

Effects of the Invention

According to the present invention, since the receptacle has a structure in which the shutter is provided in front of the optical connection part of the receptacle, and the shutter is opened when the receptacle and the plug are connected to each other, any metal abrasion powder produced by rubbing of the electrical connection part of the plug and the electrical connection part of the receptacle against each other when the electrical connection is established can be prevented from adhering to the optical connection part of the receptacle.

Therefore, the problem of the degradation of the optical coupling efficiency due to adhesion of the metal abrasion powder to the optical connection part of the receptacle can be solved.

DETAILED DESCRIPTION OF THE EMBODIMENTS

Figure 1A:
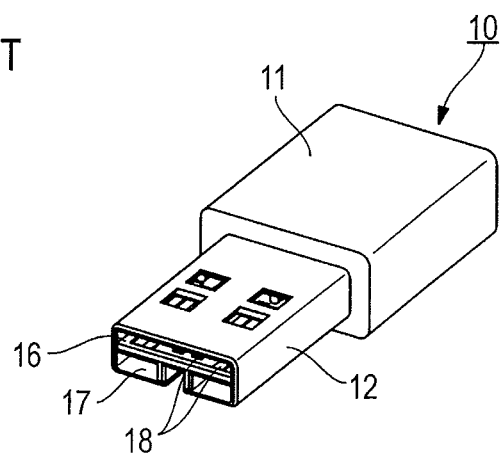
FIG. 1A is a perspective view of a plug of a conventional electrical-optical hybrid connector.
Figure 1B:
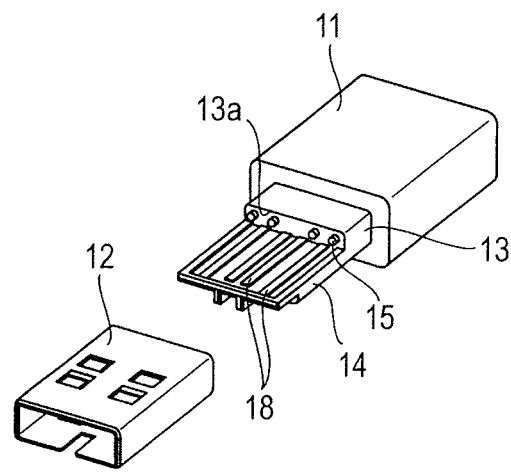
FIG. 1B is a partially exploded perspective view of the plug of the conventional electrical-optical hybrid connector.
Figure 1C:
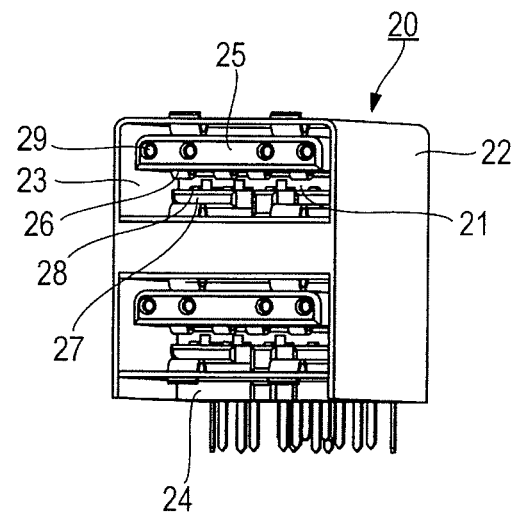
FIG. 1C is a perspective view of a receptacle of the conventional electrical-optical hybrid connector.
Figure 2A:
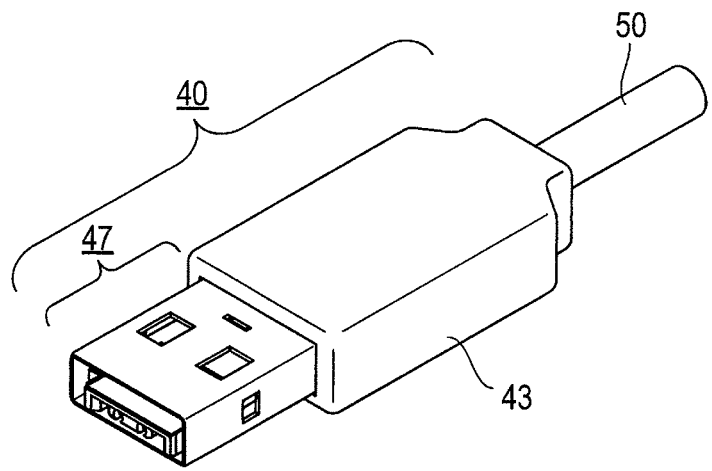
FIG. 2A is a perspective view showing an example of a configuration of a plug of an electrical-optical hybrid connector according to an embodiment of the present invention.
Figure 2B:
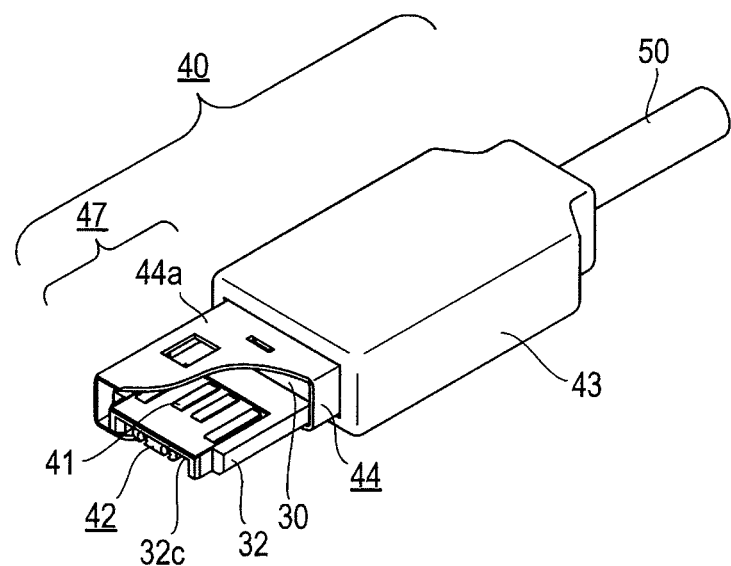
FIG. 2B is a partially cut-away perspective view showing the example of the configuration of the plug shown in FIG. 2A.
Figure 3A:
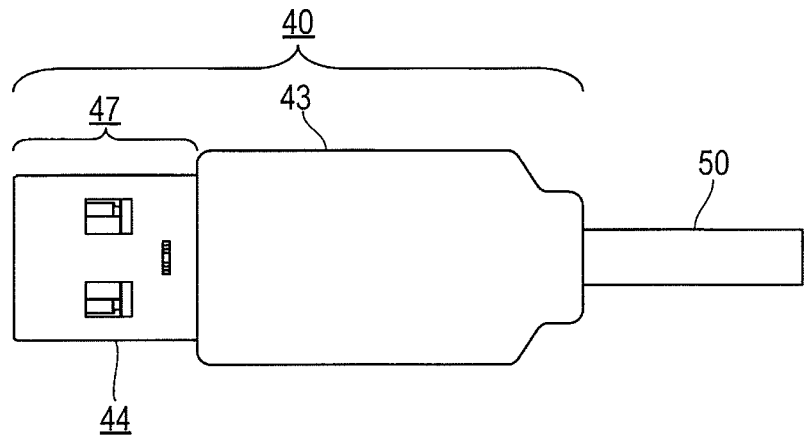
FIG. 3A is a plan view of the plug shown in FIG. 2A.
Figure 3B:
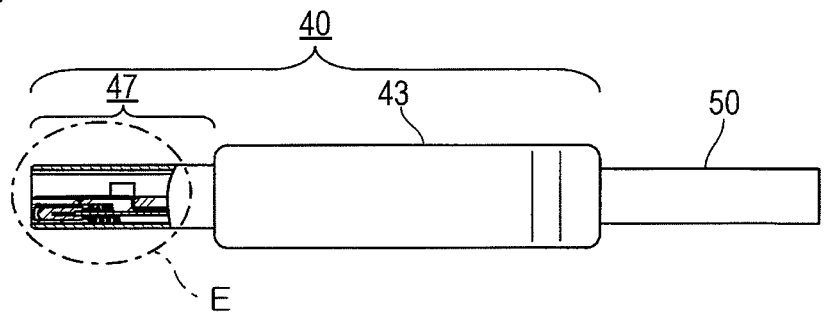
FIG. 3B is a side view of the plug shown in FIG. 2A (partially shown in section)
Figure 3C:
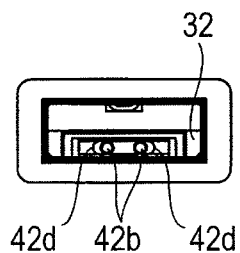
FIG. 3C is a front view of the plug shown in FIG. 2A.
Figure 3D:
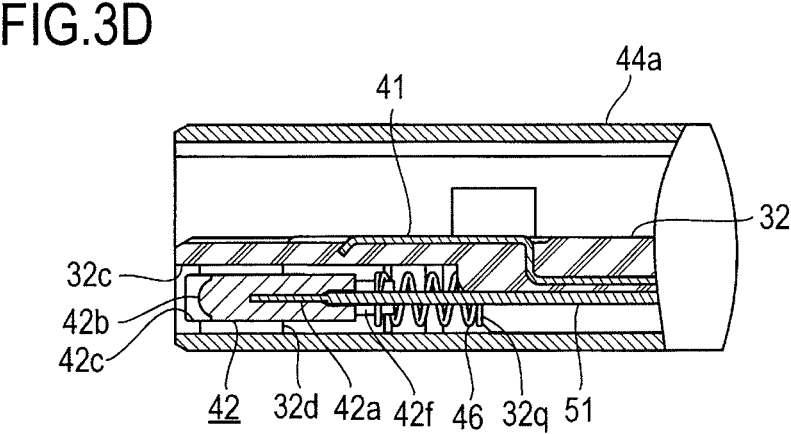
FIG. 3D is an enlarged view of a part E shown in FIG. 3B.

An embodiment of the present invention will be described with reference to the drawings. Note that, for the simplicity of the drawings, the reference numerals of identical components may sometimes be omitted.

Figure 4:
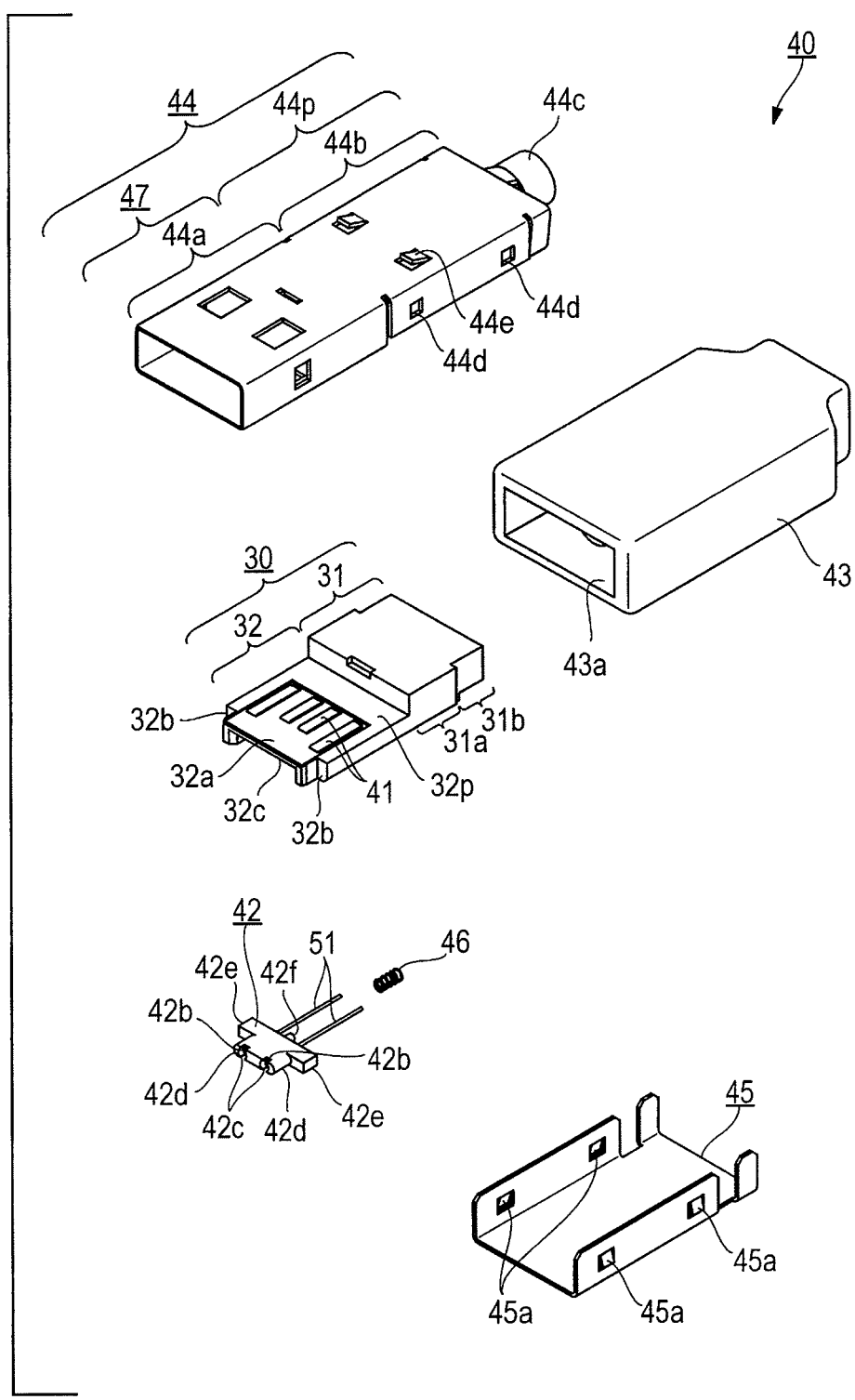
FIG. 4 is an exploded perspective view of the plug shown in FIG. 2A.
Figure 5A:
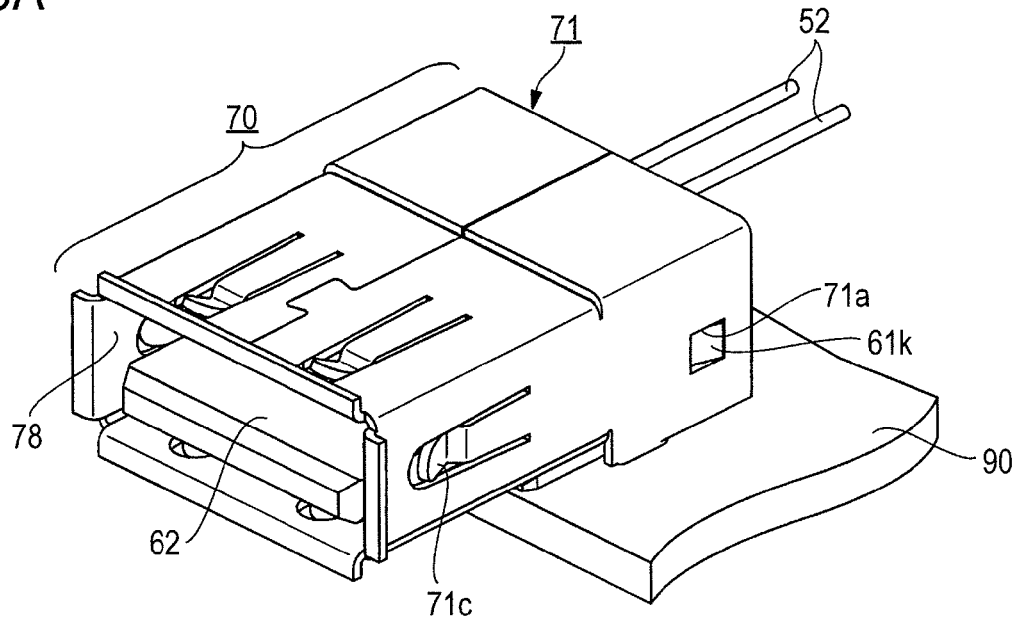
FIG. 5A is a perspective view showing an example of a configuration of a receptacle of the electrical-optical hybrid connector according to the embodiment of the present invention.
Figure 5B:
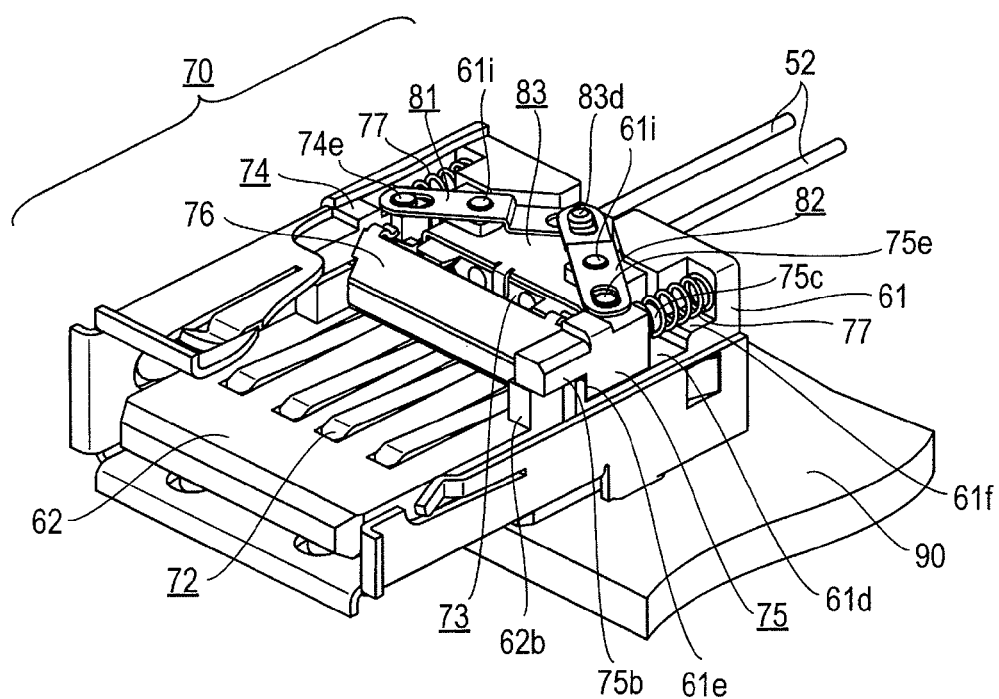
FIG. 5B is a partially cut-away perspective view showing the example of the configuration of the receptacle shown in FIG. 5A.

FIGS. 2A and 2B and 3A to 3D show an example of a configuration of a plug 40 of an electrical-optical hybrid connector according to this embodiment. FIG. 4 is an exploded perspective view of the plug 40. The electrical-optical hybrid connector according to this embodiment comprises the plug 40 and a receptacle 70 described later.

The plug 40 has an insulating main body 30, terminals 41, an optical part 42, a hood 43, and a metal shell body. The shell body comprises a first shell 44 and a second shell 45.

The insulating main body 30 has a base part 31 having a substantially rectangular parallelepiped outer shape and a tongue piece 32 extending from one end part of the base part 31. The insulating main body 30 comprising the base part 31 and the tongue piece 32 integrally formed is made of a synthetic resin, for example. A shallow recess 32a is formed in one planar surface 32p of the tongue piece 32. The recess 32a extends from one end part of the tongue piece 32 (specifically, the outward end part of the plug 40) to the vicinity of the center of the tongue piece 32. Four terminals 41 forming an electrical connection part are arranged in parallel with each other in the recess 32a. Each terminal 41 is attached to the insulating main body 30 by insert molding. A tip end part of the tongue piece 32 has notches 32b at both ends in the width direction.

The first shell 44 comprises a front half part 44a and a rear half part 44b formed integrally with the front half part 44a. The front half part 44a of the first shell 44 has the shape of a flat rectangular pipe. The rear half part 44b of the first shell 44 has the outer shape of a channel steel. On one end of the rear half part 44b (that is, one end of the first shell 44), a fixing part 44c having a U-shaped cross section for holding and fixing a cable 50 therein is formed to protrude outward.

The second shell 45 is a part to be fitted and fixed to the rear half part 44b of the first shell 44. The second shell 45 has the outer shape of a channel steel. Two catch claws 45a are formed on each side wall of the second shell 45. Each catch claw 45a is formed by cutting a part of the side wall and pulling the cut up outward. Catch openings 44d, with which the catch claws 45a are to be engaged, are formed in both side walls of the rear half part 44b. The second shell 45 is fitted and fixed to the rear half part 44b by engagement between the catch claws 45a and the catch openings 44d.

The optical part 42 is made of a transparent material, such as an acrylic resin. According to this embodiment, the optical part 42 has two parallel insertion holes 42a, and two optical fibers 51 are attached to the optical part 42. More specifically, the tip end of a core part (for example, a core and a cladding) of each optical fiber 51 is inserted into the corresponding insertion hole 42a. Two lenses 42b are formed integrally with the optical part 42 so as to face the end faces of the optical fibers 51 inserted and fixed in the insertion holes 42a. According to this embodiment, the two lenses 42b are formed in two recesses 42c formed in one end part of the optical part 42 (more specifically, the outward end part of the plug 40). Both side walls of the optical part 42 between which the two recesses 42c intervene have the shape of a semicircular column. Two semicircular column-shaped side walls 42d form an alignment structure of the optical part of the plug 40 that is to be engaged with an alignment structure of an optical part 73 of the receptacle 70 described later. The other end part of the optical part 42 (more specifically, the end part in which the insertion holes 42a open) is expanded at both sides from the two semicircular column-shaped side walls 42d to form two protrusions 42e.

The optical part 42 is housed in a recess 32c formed in the other planer surface of the tongue piece 32 (the planar surface opposite to the planar surface 32p). The recess 32c is formed to extend from one end part of the tongue piece 32 (more specifically, the outward end part of the plug 40) to the vicinity of the center of the tongue piece 32. A coil spring 46 is disposed between the optical part 42 and a side wall surface 32q of the recess 32c closer to the base part 31. A shaft 42f into which the coil spring 46 is inserted and by which the coil spring 46 is positioned protrudes from the other end part of the optical part 42 (more specifically, the end part in which the insertion holes 42a open). The coil spring 46 pushes the optical part 42 forward (that is, in a direction away from the base part 31). The two protrusions 42e of the optical part 42 abut against step parts 32d formed on both side walls of the recess 32c, thereby preventing the optical part 42 from dropping off the recess 32c.

The tongue piece 32 and a part 31a of the base part 31 of the insulating main body 30 with the optical part 42 housed in the recess 32c are inserted into the front half part 44a of the first shell 44. The second shell 45 is fitted and fixed to the rear half part 44b of the first shell 44, with the both holding a remaining part 31b of the base part 31. The hood 43 is fitted to a girth of a part 44p of the first shell 44 to which the second shell 45 is attached (more specifically, the whole of the rear half part 44b including the second shell 45 and a part of the front half part 44a close to the rear half part 44b). That is, a part of the structure comprising the first shell 44 and the second shell 45 fitted and fixed to each other is housed in a housing hole 43a of the hood 43. The rear half part 44b has two lock claws 44e formed on a flat plate part thereof excluding both side walls to prevent the first shell 44 from dropping off the hood 43. The plug 40 has the structure described above. The cable 50 is held and fixed in the fixing part 44c of the first shell 44 and drawn to the outside at one end of the hood 43 (the end farther from the insulating main body 30).

The part of the plug 40 having the structure described above that is not covered by the hood 43 is an insertion fitting part 47 to be inserted into the receptacle. The optical part 42 of the plug 40 to establish an optical connection is positioned at the front end part of the insertion fitting part 47 (that is, the end part facing the receptacle when the plug 40 is inserted into the receptacle described later). On the other hand, the terminals 41 of the plug 40 to establish an electrical connection is positioned behind the optical connection part (that is, at a distance from the front end of the insertion fitting part 47) and exposed in the space between the upper surface of the tongue piece 32 and the first shell 44.

Next, a structure of the receptacle 70 to which the plug 40 described above is connected will be described.

FIGS. 5A and 5B and 6A to 6D show an example of a configuration of the receptacle 70 according to this embodiment. FIG. 7 is an exploded perspective view of the receptacle 70.

The receptacle 70 has an insulating main body 60, a metal shell 71, terminals 72, an optical part 73, sliders 74 and 75, a shutter 76, a pair of coil springs 77, a pair of links 81 and 82, and an inner shell 83. Reference numeral 90 denotes a substrate, and FIGS. 5A and 5B and 6A to 6D show the receptacle 70 mounted on the substrate 90.

The insulating main body 60 has a base body 61 having a block-like outer shape and a tongue piece 62 extending from one end 61a of the base body 61 (the end will be referred to as a front end 61a, hereinafter). In FIGS. 5A and 5B, 6A to 6D and 7, the side of the base body 61 closer to the tongue piece 62 will be referred to as "a front side", and the opposite side will be referred to as "a rear side". The definition of the terms "front side" and "rear side" is applied to FIGS. 5A and 5B, 6A to 6D and 7. The insulating main body 60 comprising the base body 61 and the tongue piece 62 integrally formed is made of a synthetic resin, for example. Four grooves 62a are formed in parallel with each other in the direction of protrusion of the tongue piece 62 in one planar surface 62p of the tongue piece 62. The side of the planar surface 62p of the tongue piece 62 will be referred to as "an upper side", and the opposite side will be referred to as "a lower side". The definition of the terms "upper side" and "lower side" is applied to FIGS. 5A and 5B, 6A to 6D and 7.

According to this embodiment, the receptacle 70 has four terminals 72. Each terminal 72 is formed of a metal and generally has three portions. A first portion is a movable contact piece portion 72a that comes into contact with the corresponding one terminal 41 when the plug 40 is fitted into the receptacle 70. A second portion is an L-shaped press-fitting portion 72b adjacent to the movable contact piece portion 72a. The press-fitting portion 72b has catch protrusions 72d at both sides in the width direction. A third portion is a substrate mounting portion 72c adjacent to the press-fitting portion 72b. The substrate mounting portion 72c is inserted into a hole 91 in the substrate 90 and fixed to the substrate 90 by soldering. Each terminal 72 is attached to the base body 61 by the press-fitting portion 72b being press-fitted into an attachment hole 61b formed in the base body 61. In this state, the movable contact piece portion 72a is positioned in the groove 62a, and the substrate mounting portion 72c protrudes to the outside of the base body 61.

The optical part 73 is made of a transparent material, such as an acrylic resin. According to this embodiment, the optical part 73 has two parallel insertion holes 73a, and two optical fibers 52 are attached to the optical part 73. More specifically, the tip end of a core part (for example, a core and a cladding) of each optical fiber 52 is inserted into the corresponding insertion hole 73a. Two lenses 73b are formed integrally with the optical part 73 so as to face the end faces of the optical fibers 52 inserted and fixed in the insertion holes 73a. According to this embodiment, the two lenses 73b are formed on one end part 73c of the optical part 73 (more specifically, the end part that faces the optical part 42 of the plug 40 when the plug 40 and the receptacle 70 are connected to each other). At the both side ends of the one end part 73c of the optical part 73 between which the two lenses 73b intervene, column-shaped parts 73d are formed so as to protrude forward (more specifically, in the direction toward the plug 40 in the state where the plug 40 and the receptacle 70 are connected to each other). In other words, the optical part 73 has two column-shaped parts 73d formed to extend toward the shutter 76 described later in the state where the plug 40 is not connected to the receptacle 70. A V-shaped groove 73e is formed in the inner side wall of each column-shaped part 73d. The two V-shaped grooves 73e form an alignment structure to be engaged with the alignment structure of the optical part of the plug 40 (that is, the two semicircular column-shaped side walls 42d of the optical part 42).

The optical part 73 having the structure described above has a generally planar outer shape. The inner shell 83 is attached to the optical part 73.

The inner shell 83 is formed by bending a metal plate. The inner shell 83 has a planar part 83a, two side wall parts 83b, and flange parts 83c each slightly protruding inward formed by bending one end part of each side wall part 83b (the one end farther from the planar part 83a). The planar part 83a has a joint shaft 83d protruding outward at the center of a rear half part thereof and a protrusion piece 83e protruding inward at the center of the front end thereof. A catch piece 83f is formed on each of the two side wall parts 83b. Each catch piece 83f is formed by cutting a part of the side wall part 83b and pulling the cut up inward.

The optical part 73 is inserted into the inner shell 83 from the end of the rear half part of the inner shell 83 and thereby attached to the inner shell 83. The one end part 73c of the optical part 73 abuts against the protrusion piece 83e of the inner shell 83. The catch pieces 83f of the inner shell 83 are positioned in notch parts 73f formed in both sides in the width direction of the rear half part of the optical part 73. A floating end of the catch piece 83f abuts against a step part 73g at the front end of the notch part 73f. The optical part 73 is held between the catch pieces 83f and the protrusion piece 83e and thereby fixed in the inner shell 83.

The optical part 73 attached to the inner shell 83 is slidably housed in a housing groove 61c formed to penetrate the base body 61 of the insulating main body 60 in parallel with the direction of protrusion of the tongue piece 62. The direction of sliding of the optical part 73 is the direction of extension of the housing groove 61c (that is, the direction of protrusion of the tongue piece 62). In the state where the optical part 73 is housed in the housing groove 61c, the tip ends of the column-shaped parts 73d of the optical part 73 are positioned slightly behind the front end 61a of the base body 61 (see FIG. 6D).

The base body 61 has grooves 61d along both ends in the width direction thereof between which the housing groove 61c intervenes. A stopper part 61e is formed at the front end of each groove 61d to protrude from the base body 61. Protrusion parts 62b integral with the stopper parts 61e are formed on the tongue piece 62 in front of the stopper parts 61e (on the side closer to the plug 40 in the state where the plug 40 and the receptacle 70 are connected to each other). Recesses 61f integral with the grooves 61d are formed at the rear end of the grooves 61d. The level of the bottom surface of the recesses 61f is higher than the level of the bottom surface of the grooves 61d. The sliders 74 and 75 are disposed in the two grooves 61d formed in the base body 61.

The sliders 74 and 75 have a block-like shape. The sliders 74 and 75 have extension parts 74b and 75b protruding forward (more specifically, in the direction toward the plug 40 in the state where the plug 40 and the receptacle 70 are connected to each other) which are formed at the front ends of base parts 74a and 75a (more specifically, the ends closer to the plug 40 in the state where the plug 40 and the receptacle 70 are connected to each other), respectively. In addition, shafts 74c and 75c protrude rearward from the backs of the base parts 74a and 75a, respectively. Shaft receiving holes 74d and 75d are formed in the inner side walls of the base parts 74a and 75a of the sliders 74 and 75, respectively.

The shutter 76 has a rectangular plate part 76a, two support parts 76b protruding from the plate part 76a at the upper end parts of both ends in the longitudinal direction of the plate part 76a, and two spring pieces 76c. The plate part 76a has an inclined face part 76d and a vertical face part 76e formed integrally with the inclined face part 76d. The vertical face part 76e is positioned at the lower end of the inclined face part 76d (the end of the inclined face part 76d closer to the tongue piece 62 in the state where the shutter 76 is attached to the insulating main body 60 via the sliders 74 and 75 as described later). A shaft part 76f protruding outward is provided on each support part 76b. The two spring pieces 76c protrude from the upper end part of the plate part 76a at both ends in the longitudinal direction of the plate part 76a and extend to form a V shape with the inclined face part 76d of the plate part 76a. The tip end of the spring piece 76c is bent in a V shape.

The sliders 74 and 75 are attached to the shutter 76 by the respective shaft receiving holes 74d and 75d being engaged with the corresponding shaft part 76f of the shutter 76. Therefore, the shutter 76 is supported by the sliders 74 and 75 so as to be rotatable about an axis of the shaft parts 76f.

The sliders 74 and 75 supporting the shutter 76 are slidably disposed in the two grooves 61d in the base body 61. In this state, the two coil springs 77 are positioned by the shafts 74c and 75c, respectively. In addition, the two coil springs 77 are disposed between the sliders 74, 75 and rear wall surfaces 61x of the recesses 61f of the base body 61. The sliders 74 and 75 are pushed forward (more specifically, in the direction toward the plug 40 in the state where the plug 40 and the receptacle 70 are connected to each other) by the coil springs 77 and pressed against the stopper parts 61e of the base body 61. In this state, the front end surfaces of the extension parts 74b and 75b of the sliders 74 and 75 are located at the same location of the front end surfaces of the protrusion parts 62b formed on the tongue piece 62 (see FIG. 6D).

Figure 6A:
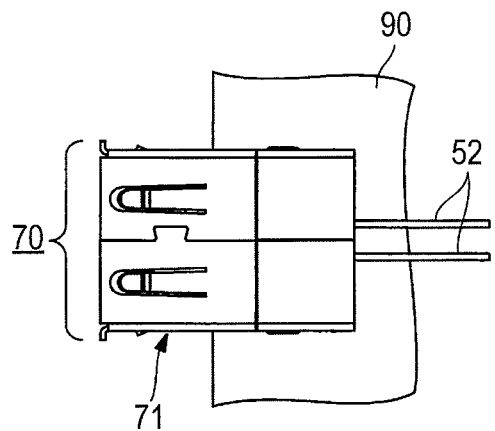
FIG. 6A is a plan view of the receptacle shown in FIG. 5A.
Figure 6B:
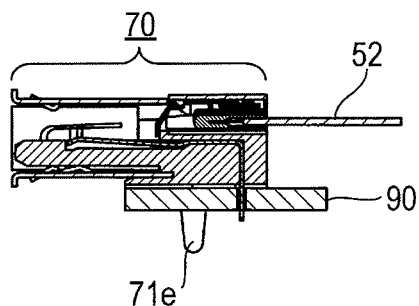
FIG. 6B is a longitudinal-sectional view of the receptacle shown in FIG. 5A.
Figure 6C:
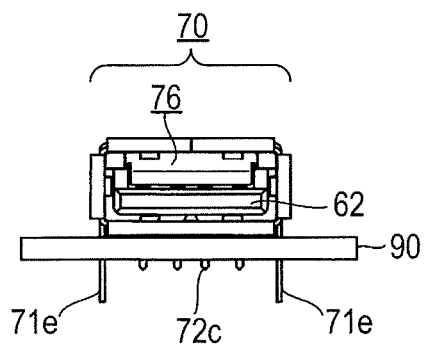
FIG. 6C is a front view of the receptacle shown in FIG. 5A.
Figure 6D:
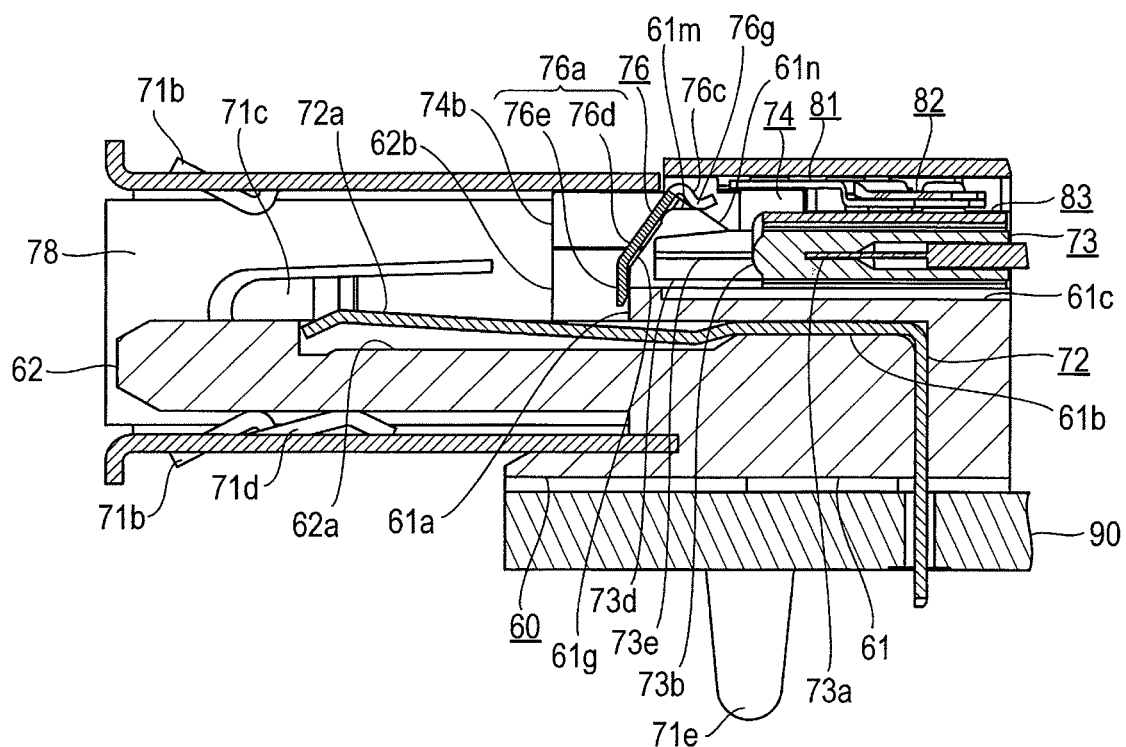
FIG. 6D is an enlarged view of FIG. 6B.
Figure 7:
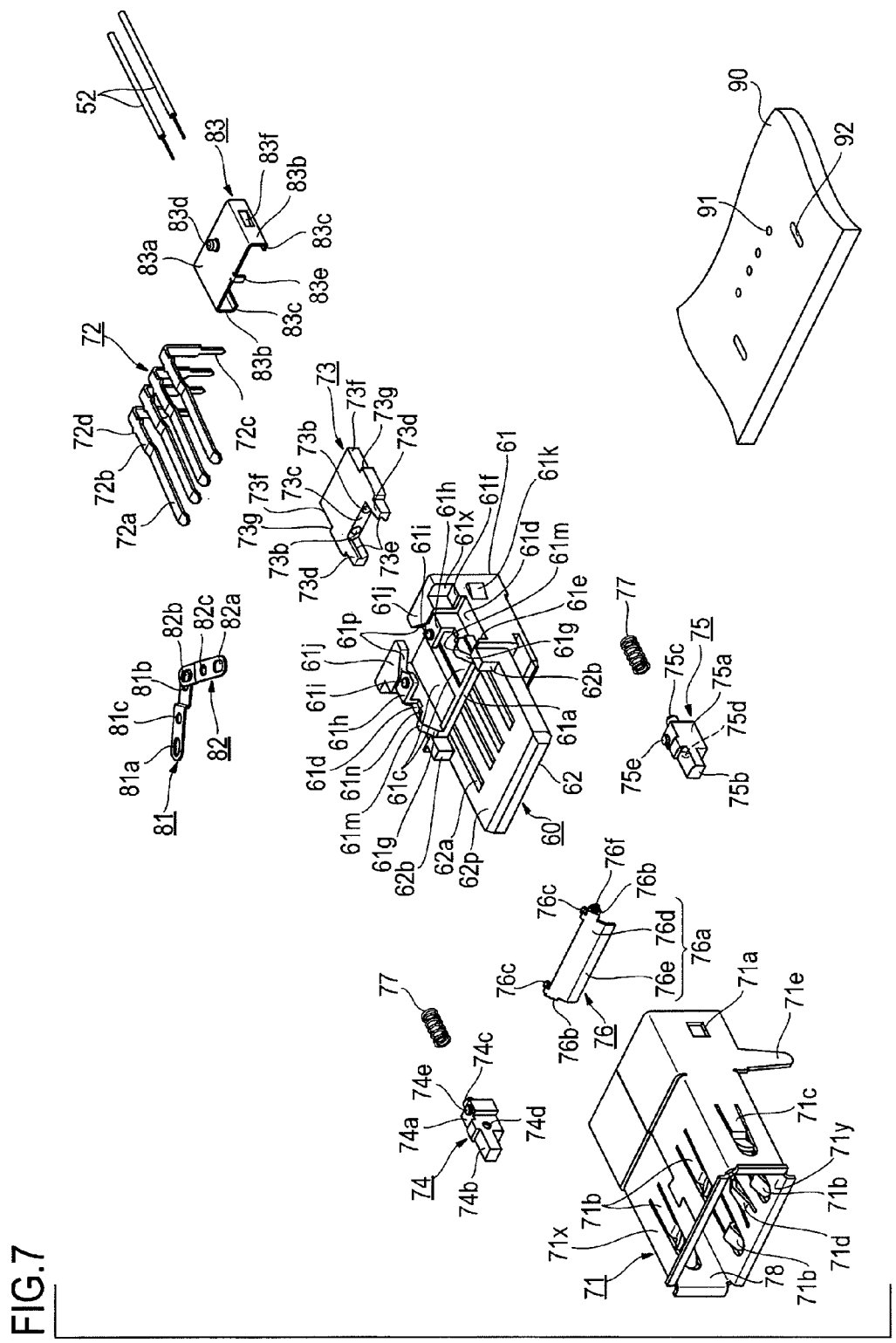
FIG. 7 is an exploded perspective view of the receptacle shown in FIG. 5A.

The shutter 76 supported by the sliders 74 and 75 is positioned at the front end 61a of the base body 61 (see FIG. 6D). The plate part 76a of the shutter 76 has enough size to cover the front end part of the optical part 73 (more strictly, the optical part 73 attached to the inner shell 83) exposed at the front end 61a of the base body 61 (see FIG. 5B). More specifically, the width of the plate part 76a is approximately equal to the distance between the side walls of the housing groove 61c, and the height of the plate part 76a is greater than the height of the front end part of the optical part 73. Parts of the front end 61a of the base body 61 facing both ends of the plate part 76a in the longitudinal direction of the plate part 76a, that is, upper parts of the front end part of the side walls of the housing groove 61c (parts of the front end part farther from the tongue piece 62) each have an inclined surface 61g. The inclined face part 76d of the plate part 76a of the shutter 76 is positioned along the inclined surfaces 61g.

The optical part 73 attached to the inner shell 83 slides in the opposite direction to the direction of sliding of the sliders 74 and 75 by the action of a link mechanism. The link mechanism comprises the pair of links 81 and 82.

The link 81 has rounded rectangular holes 81a and 81b formed at both ends thereof and a support hole 81c formed at a center part thereof. Similarly, the link 82 has rounded rectangular holes 82a and 82b formed at both ends thereof and a support hole 82c formed at a center part thereof.

On the other hand, the housing groove 61c has two plate-shaped support parts 61h formed integrally with the base body 61 at upper parts of the rear half parts of both side walls thereof. The two support parts 61h protrude above the housing groove 61c like eaves. A support shaft 61i protrudes from the upper surface of each support part 61h (the surface of the support part 61h that does not face the bottom surface of the housing groove 61c). In addition, a plate-shaped protrusion part 61j integral with the base body 61 is formed adjacent to each support part 61h behind the support part 61h. The level of the upper surface of each protrusion part 61j (the surface of the protrusion part 61j that does not face the bottom surface of the housing groove 61c) is slightly higher than the level of the upper surface of the corresponding support part 61h. The two protrusion parts 61j protrude above the housing groove 61c like eaves. A corner of the front part of each protrusion part 61j facing that of the other protrusion part 61j is obliquely notched to form an inclined face 61p.

The support shafts 61i are inserted into the support holes 81c and 82c in the pair of links 81 and 82 to provide engagement between the pair of links 81 and 82 and the insulating main body 60. The joint shaft 83d protruding from the inner shell 83 is inserted into the rectangular holes 81b and 82b at one ends of the links 81 and 82 to provide engagement between the pair of links 81 and 82 and the inner shell 83. The one end parts of the links 81 and 82 are overlaid one on another at the site of engagement between the pair of links 81 and 82 and the inner shell 83. Shafts 74e and 75e are inserted into the rectangular holes 81a and 82a at the other ends of the links 81 and 82 to provide engagement between the link 81 and the slider 74 and engagement between the link 82 and the slider 75.

The links 81 and 82 are supported by the respective support shafts 61i of the base body 61 and each of the links 81 and 82 is rotatable about the corresponding support shafts 61i. The links 81 and 82 couple the sliders 74 and 75 and the optical part 73 held in the inner shell 83 to each other, and the optical part 73 moves in association with the sliders 74 and 75.

The shell 71 is attached to the insulating main body 60 with the optical part 73 attached to the inner shell 83, the sliders 74 and 75, the shutter 76 and the link mechanism attached thereto. The shell 71 has the shape of a rectangular pipe and is attached to the insulating main body 60 so as to surround the insulating main body 60. More specifically, the shell 71 is attached to the insulating main body 60 by inserting the insulating main body 60 into the shell 71 from the rear of the shell 71. Catch protrusions 61k protruding from both side walls of the base body 61 of the insulating main body 60 are engaged with catch openings 71a formed in both side walls of the shell 71, thereby fixing the shell 71 to the insulating main body 60.

There is a housing space 78 surrounding the tongue piece 62 that is defined by the shell 71. The housing space 78 receives the insertion fitting part 47 of the plug 40. Two spring pieces 71b, which come into elastic contact with the outer surface of the insertion fitting part 47 (more specifically, the outer surface of the first shell 44 of the plug 40), are provided on each of an upper wall part 71x and a bottom wall part 71y of the shell 71 that define the housing space 78. Each spring piece 71b is formed by cutting a part of the upper wall part 71x or the bottom wall part 71y of the shell 71 and pulling the cut up inward. Similarly, a spring piece 71c is formed on each of both side walls of the shell 71. Furthermore, a spring piece 71d is formed on the bottom wall part 71y of the shell 71. The floating end of the spring piece 71d is directed to the rear of the shell 71, which is the opposite direction to the spring pieces 71b and 71c. In the rear half part of the shell 71, parts of both side walls are extended to protrude downward to form terminal parts 71e that are to be inserted and fixed in holes 92 in the substrate 90.

In the receptacle 70 having the structure described above, the optical part 73 that serves as an optical connection part is disposed in the space that is in direct communication with the housing space 78 at the opposite side to the inlet side of the housing space 78 that receives the plug 40 (more specifically, the housing groove 61c in communication with the housing space 78), the movable contact piece portions 72a of the terminals 72 that serve as an electrical connection part are disposed in front of the optical connection part (more specifically, at the side closer to the plug 40 in the state where the plug 40 and the receptacle 70 are connected to each other, that is, the inlet side described above), and the floating ends of the movable contact piece portions 72a slightly protrude upward beyond the upper surface of the tongue piece 62. The optical part 73 having the alignment structure formed by the pair of V-shaped grooves 73e is disposed on the base body 61 on the side of the upper surface of the tongue piece 62 on which the movable contact piece portions 72a are disposed. The shutter 76 is positioned in front of the optical part 73.

Next, connection between the plug 40 and the receptacle 70 described above will be described.

FIGS. 8A to 8D are longitudinal-sectional views for illustrating a process of connecting the plug 40 and the receptacle 70 to each other by inserting and fitting the insertion fitting part 47 of the plug 40 into the housing space 78 of the receptacle 70. FIGS. 9A to 9D are partially cut-away plan views showing the plug 40 and the receptacle 70 in that process. The steps shown in FIGS. 9A to 9D correspond to the steps shown in FIGS. 8A to 8D. In the following, this process will be described step by step.

Figure 8A:
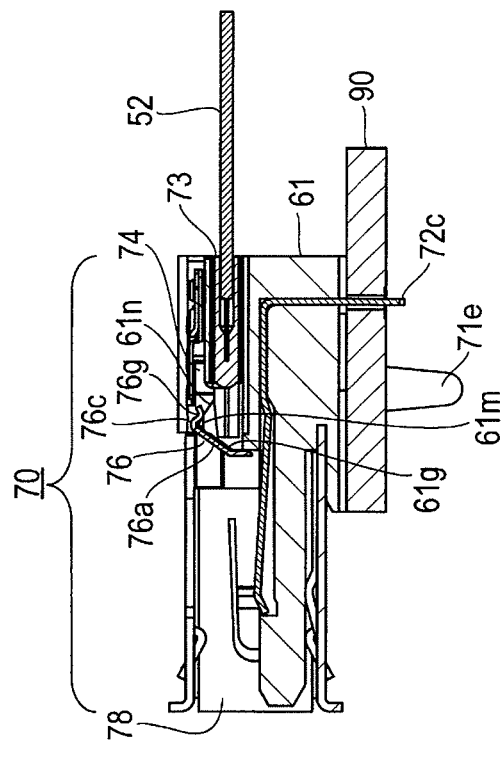
FIG. 8A is a longitudinal-sectional view for illustrating a process of inserting and fitting the plug into the receptacle.
Figure 8A:
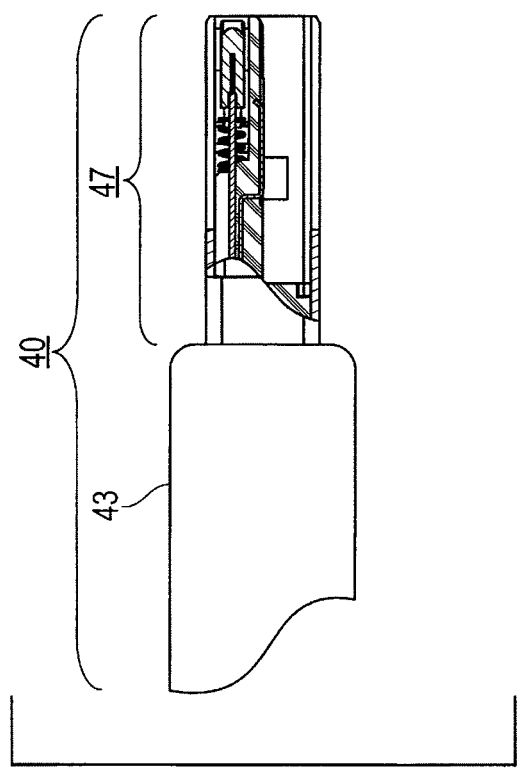
Figure 9A:
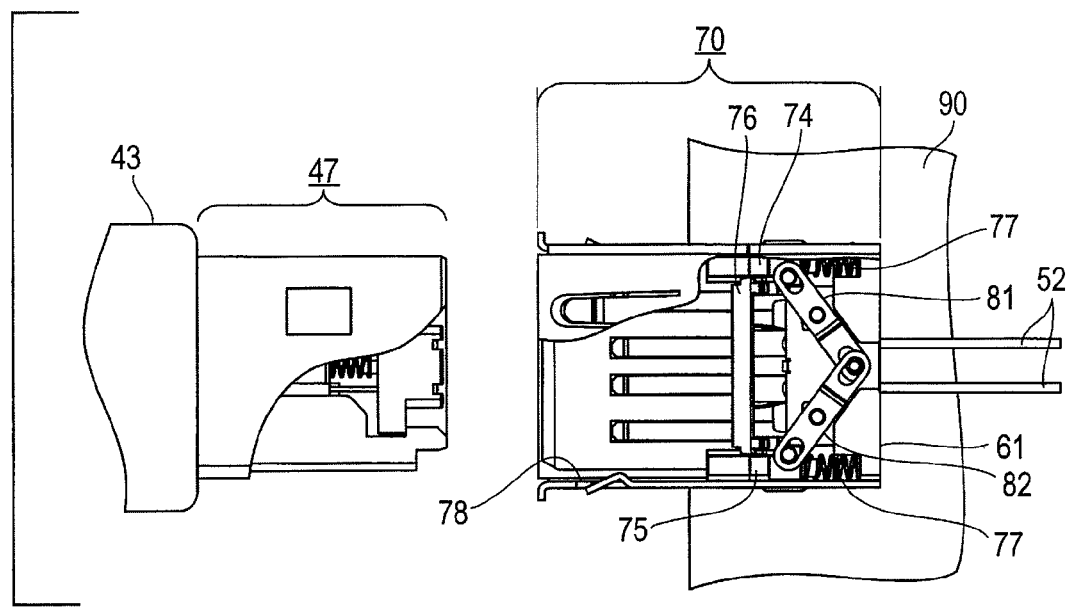
FIG. 9A is a partially cut-away plan view for illustrating a process of inserting and fitting the plug into the receptacle.

(1) The insertion fitting part 47 of the plug 40 is positioned in front of the housing space 78 of the receptacle 70 (see FIGS. 8A and 9A).

Figure 8B:
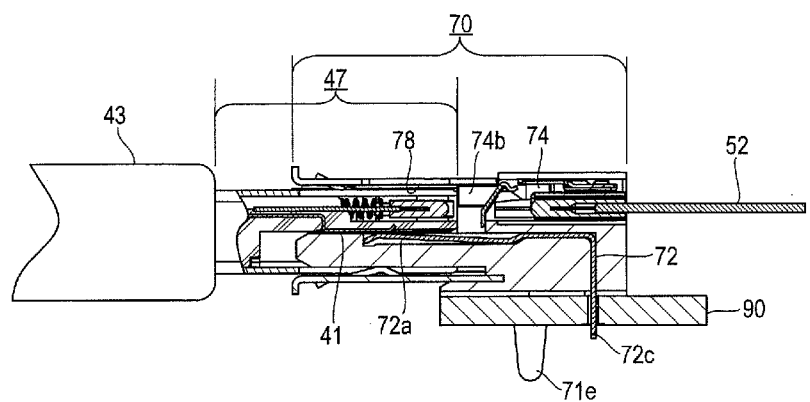
FIG. 8B is a longitudinal-sectional view for illustrating a process of inserting and fitting the plug into the receptacle.
Figure 9B:
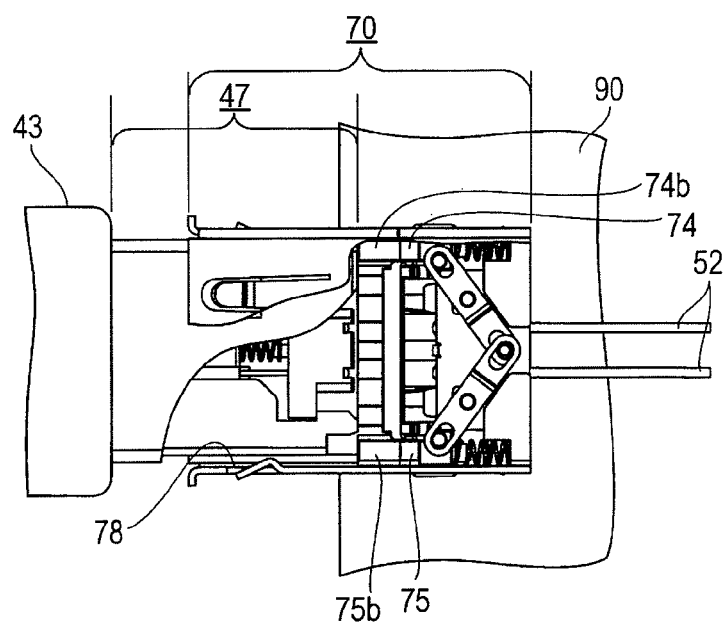
FIG. 9B is a partially cut-away plan view for illustrating a process of inserting and fitting the plug into the receptacle.

(2) The insertion fitting part 47 is inserted into the housing space 78. In the process of insertion, the terminals 41 of the plug 40 first come into contact with the movable contact piece portions 72a of the terminals 72 of the receptacle 70 and are electrically connected to the terminals 72 of the receptacle 70 (see FIGS. 8B and 9B). FIGS. 8B and 9B show the front end of the insertion fitting part 47 (the front end of the first shell 44) abutting against the front end faces of the extension parts 74b and 75b of the sliders 74 and 75.

Figure 8C:
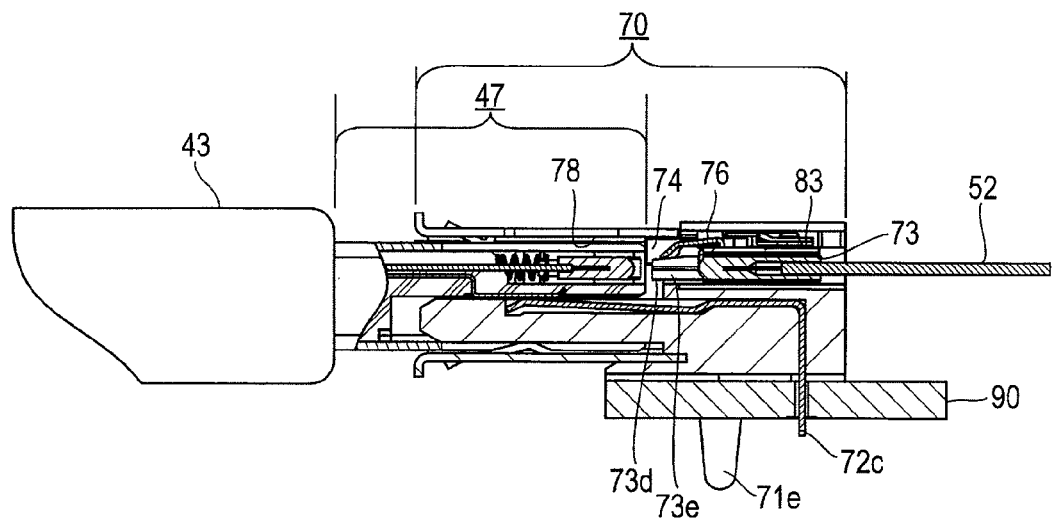
FIG. 8C is a longitudinal-sectional view for illustrating a process of inserting and fitting the plug into the receptacle.
Figure 8D:
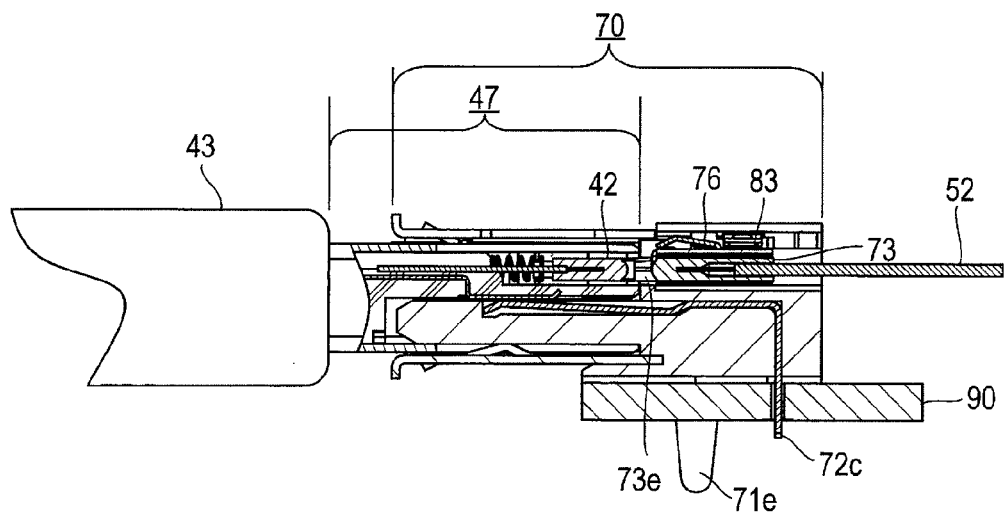
FIG. 8D is a longitudinal-sectional view for illustrating a process of inserting and fitting the plug into the receptacle.
Figure 9C:
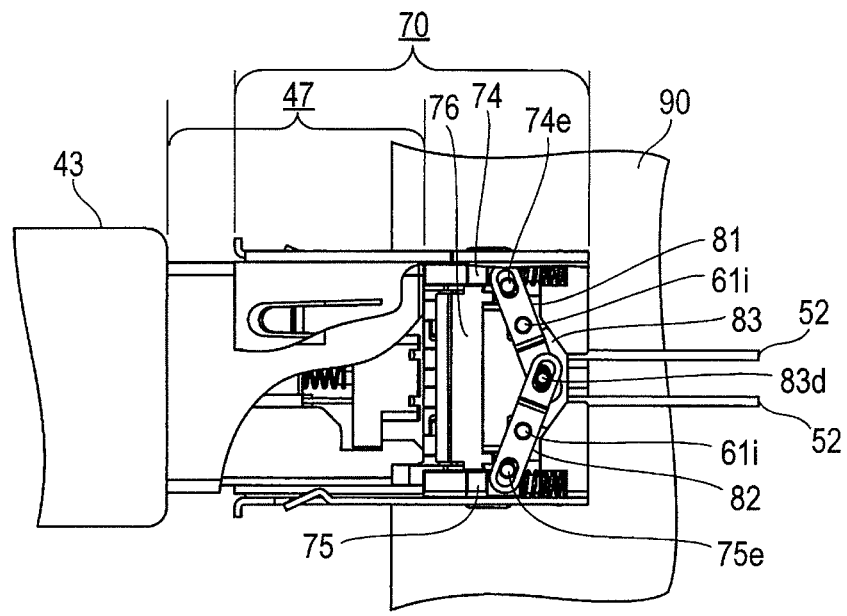
FIG. 9C is a partially cut-away plan view for illustrating a process of inserting and fitting the plug into the receptacle.
Figure 9D:
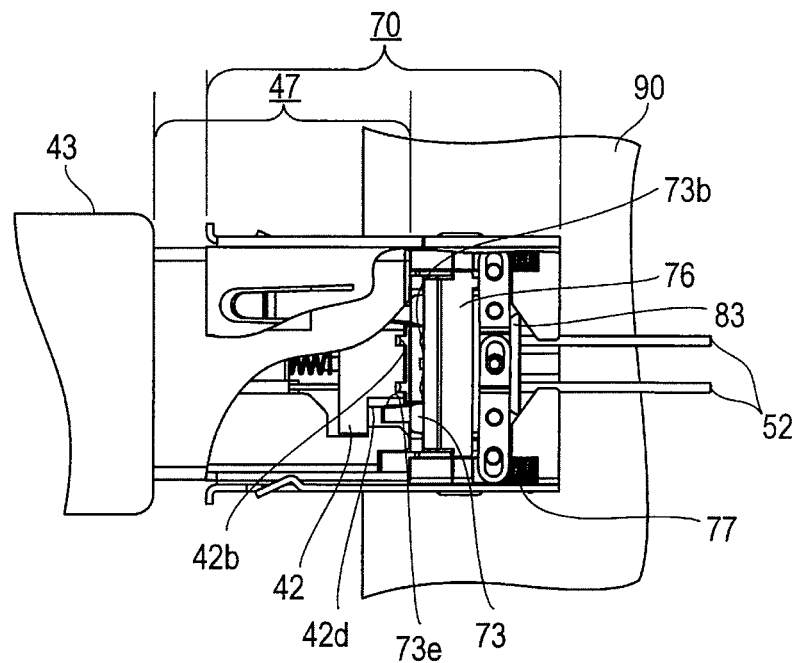
FIG. 9D is a partially cut-away plan view for illustrating a process of inserting and fitting the plug into the receptacle.

(3) As the insertion fitting part 47 is further inserted into the housing space 78, the sliders 74 and 75 are pushed by the insertion fitting part 47 to slide in the direction to compress the coil springs 77. As the sliders 74 and 75 slide, the shutter 76 moves with the sliders 74 and 75 while rotating about the axis of the shaft parts 76f. At the same time, as the sliders 74 and 75 slide, the links 81 and 82 rotate about the respective support shafts 61i, thereby causing the optical part 73 attached to the inner shell 83 to slide in the opposite direction to the direction of sliding of the sliders 74 and 75 (in other words, the optical part 73 moves into the housing space 78 to come closer to the plug 40). FIGS. 8C and 9C show a state where the shutter 76 is open, and the tip ends of the column-shaped parts 73d of the optical part 73 is positioned slightly ahead of the shutter 76.

(4) As the insertion fitting part 47 is further inserted into the housing space 78, the shutter 76 moves rearward (in the direction away from the plug 40) while rotating and becomes completely retracted behind the front face of the optical part 73 attached to the inner shell 83 (in other words, the shutter 76 is completely opened). At the same time, the optical part 73 further moves forward, that is, moves into the housing space 78 to come closer to the plug 40. Thus, the semicircular column-shaped side walls 42d of the optical part 42 of the plug 40 and the V-shaped grooves 73e of the optical part 73 are engaged with each other, and the optical part 42 of the plug 40 is optically connected to the optical part 73 of the receptacle 70 with the optical axis of the optical part 42 of the plug 40 aligned with the optical axis of the optical part 73 of the receptacle 70.

When the plug 40 is drawn out of the receptacle 70 to separate the insertion fitting part 47 from the housing space 78, the sliders 74 and 75 restore their original positions shown in FIGS. 8A and 9A by the action of the elastic restoring force of the coil springs 77. At the same time, the shutter 76 and the optical part 73 also restore their original positions (that is, the optical part 73 moves (retracts) away from the housing space 78 into the housing groove 61c), and the shutter 76 is completely closed. In this process, unlike the case of inserting and fitting the insertion fitting part 47 into the housing space 78, the optical connection is first disconnected, the shutter is closed, and then the electrical connection is disconnected.

In the state where the shutter 76 is closed, bent parts 76g at the tip ends of the two spring pieces 76c are positioned above horizontal surfaces 61m adjacent to the top of the inclined surfaces 61g, as shown in FIGS. 8A and 6D. Although the shutter 76 is rotatably supported by the sliders 74 and 75, the plate part 76a of the shutter 76 is biased so as to abut against the inclined surfaces 61g of the base body 61, that is, so that the shutter 76 is closed, since the spring pieces 76c abut against the horizontal surfaces 61m. Therefore, the posture of the shutter 76 is stable in the state where the shutter 76 is closed, and the shutter 76 does not move and is kept closed even if the posture of the receptacle 70 changes. Retraction spaces 61n are provided behind the horizontal surfaces 61m of the base body 61 to allow smooth movement of the spring pieces 76c of the shutter 76 when the shutter 76 moves while rotating. The inclined surfaces 61g are formed to be inclined toward the direction of movement of the shutter 76, thereby allowing smooth rotation of the shutter 76.

As described above, when the insertion fitting part 47 of the plug 40 is inserted into the housing space 78 of the receptacle 70, the electrical connection is first established, and then, when establishment of the electrical connection is substantially completed, the shutter 76 of the receptacle 70 opens, and the optical connection is established. Therefore, the shutter 76 prevents any metal abrasion powder produced by rubbing the terminals 41 of the plug 40 against the terminals 72 of the receptacle 70 from adhering to the optical part 73 of the receptacle 70.

In addition, since the optical part 42 of the plug 40 is disposed at the front end of the insertion fitting part 47 and is positioned in front of the terminals 41, any metal abrasion powder produced by rubbing the terminals 41 against the terminals 72 hardly adheres to the optical part 42.

In this way, the problem of the degradation of the optical coupling efficiency due to adhesion of the metal abrasion powder to the optical part 73 of the receptacle 70 or the optical part 42 of the plug 40 can be solved. In addition, the alignment structure provided in the optical part 73 of the receptacle 70 is also protected by the shutter 76, so that a misalignment of the optical axis of the optical parts 42 and the optical axis of the optical parts 73 is prevented from occurring because of adhesion of a metal abrasion powder to any alignment structure. In addition, the problem that fitting of the plug 40 into the receptacle 70 in the electrical-optical hybrid connector fails does not arise.

Since the optical part 42 that serves as the optical connection part in the plug 40 is disposed at the front end of the insertion fitting part 47, the optical part 42 can be readily cleaned even if a metal abrasion powder adheres to the optical part 42. On the other hand, the optical part 73 that serves as the optical connection part in the receptacle 70 is disposed in the rear space in communication with the housing space 78 that is difficult to clean. However, since the shutter 76 is closed except when the optical connection is established as described above, no metal abrasion powder adheres to the optical part 73, so that the optical part 73 does not need cleaning. Since the shutter 76 is closed except when the optical connection is established, not only adhesion of a metal abrasion powder but also adhesion of dust or the like in the air is prevented, and exposure of the retinas of the eyes of an operator handling the electrical-optical hybrid connector to light energy is also prevented.

Furthermore, as is apparent from this embodiment, the optical part 73 of the receptacle 70 is coupled via the link mechanism with the sliders 74 and 75 that open and close the shutter 76 and moves forward in association with the shutter 76 when the shutter 76 is opened and rearward in association with the shutter 76 when the shutter 76 is closed. In this way, the optical part 73 immediately moves forward to establish an optical connection with the optical part 42 of the plug 40 when the shutter 76 is opened, so that a more reliable and satisfactory dust-proof capability is provided. In other words, the time after the shutter is opened and before the optical connection between the optical connection part of the plug and the optical connection part of the receptacle is established can be reduced, thereby reducing the risk of adhesion of a metal abrasion powder or the like to the optical connection parts and providing a more reliable dust-proof capability.

Since the optical part 73 of the receptacle 70 moves toward the plug 40 during establishment of the optical connection (the connection between the plug 40 and the receptacle 70), the insertion stroke can be reduced. Therefore, the length of the electrical-optical hybrid connector can be reduced.

What is claimed is:

1. A receptacle of an electrical-optical hybrid connector comprising a plug having an insertion fitting part and the receptacle having a housing space that receives said insertion fitting part, the receptacle comprising:
    an optical connection part disposed in a space in communication with said housing space; and
    an electrical connection part disposed in front of said optical connection part in said housing space,
    wherein a shutter that is opened when said receptacle and said plug are connected to each other is provided in front of said optical connection part, and
    said optical connection part moves forward in association with said shutter when said shutter is opened, and moves rearward in association with said shutter when said shutter is closed.

2. The receptacle according to claim 1, further comprising:
    an insulating main body including a base body and a tongue piece extending from the base body;
    a shell that surrounds said insulating main body and forms said housing space around said tongue piece;
    a terminal disposed on one planar surface of said tongue piece;
    an optical part to which an optical fiber is attached that is housed in a housing groove formed in said base body on the side of said one planar surface;
    a pair of sliders which are capable of sliding in a direction of insertion of said insertion fitting part into said housing space and which are disposed in groove parts formed in said base body on the opposite sides of said housing groove and at both ends in a width direction of said base body;
    a pair of springs that bias said pair of sliders in an opposite direction to said direction of insertion; and
    a link mechanism that links said pair of sliders and said optical part to each other,
    wherein said optical connection part includes said optical part,
    said electrical connection part includes said terminal,
    said shutter has a plate-like shape;
    shaft parts protruding outward from said shutter at both ends of said shutter are engaged with shaft holes formed in said pair of sliders,
    said terminal first comes into electrical connection with the electrical connection part of said plug, said pair of sliders move rearward by being pushed by the front end of said insertion fitting part, and said shutter moves rearward while rotating about said shaft parts when said insertion fitting part is inserted into said housing space, and
    said optical part is made to slide in an opposite direction to the direction of sliding of said pair of sliders by said link mechanism.

3. The receptacle according to claim 2, wherein said link mechanism comprises:
    a pair of links, each of said links having rectangular holes formed at both ends thereof and a support hole formed at a center part thereof;

a pair of support shafts that protrude from said base body, each of support shafts being inserted into and engaged with the support hole in a corresponding one of said pair of links;
a joint shaft that protrudes from an inner shell attached to said optical part and is inserted into and engaged with the rectangular holes at one ends of said pair of links; and
shafts that protrude from said pair of sliders and are inserted into and engaged with the rectangular holes at the other ends of said pair of links,
wherein as said pair of sliders slide, said pair of links rotate about their respective support shafts to make said optical part slide in the opposite direction to the direction of sliding of said pair of sliders.

4. The receptacle according to claim 2, wherein said shutter is disposed in front of said housing groove, and
said shutter has enough size to cover a front end part of said optical part.

5. The receptacle according to claim 4, wherein an inclined surface that is inclined toward a direction in which said shutter retracts is formed at each of parts of said base body facing said both ends of said shutter, and
said shutter has a shape conforming to said inclined surfaces.

6. The receptacle according to claim 5, wherein a spring piece that biases said shutter in a direction to close said shutter is provided on said shutter.

7. An electrical-optical hybrid connector comprising a plug having an insertion fitting part and a receptacle having a housing space that receives the insertion fitting part,
wherein said receptacle is a receptacle according to claim 6, and
said plug has an optical connection part disposed at a front end of said insertion fitting part and an electrical connection part disposed behind said optical connection part.

8. The electrical-optical hybrid connector according to claim 7, wherein said plug comprises:
an insulating main body including a base part and a tongue piece extending from the base part;
a shell that surrounds said insulating main body and forms said insertion fitting part;
a terminal disposed on one planar surface of said tongue piece and exposed in a space between said one planar surface and said shell; and
an optical part to which an optical fiber is attached and which is disposed in a recess part formed on another planar surface of said tongue piece,
wherein said optical connection part of said plug includes said optical part, and
said electrical connection part of said plug includes said terminal.

9. The electrical-optical hybrid connector according to claim 8, wherein said optical part of said plug includes:
a recess in which a lens facing an end face of said optical fiber is formed; and
two semicircular column-shaped side walls to be engaged with an optical part in said receptacle that are formed on opposite sides of said recess.

10. An electrical-optical hybrid connector comprising a plug having an insertion fitting part and a receptacle having a housing space that receives the insertion fitting part,
wherein said receptacle is a receptacle according to claim 5, and
said plug has an optical connection part disposed at a front end of said insertion fitting part and an electrical connection part disposed behind said optical connection part.

11. The electrical-optical hybrid connector according to claim 10, wherein said plug comprises:
an insulating main body including a base part and a tongue piece extending from the base part;
a shell that surrounds said insulating main body and forms said insertion fitting part;
a terminal disposed on one planar surface of said tongue piece and exposed in a space between said one planar surface and said shell; and
an optical part to which an optical fiber is attached and which is disposed in a recess part formed on another planar surface of said tongue piece,
wherein said optical connection part of said plug includes said optical part, and
said electrical connection part of said plug includes said terminal.

12. The electrical-optical hybrid connector according to claim 11, wherein said optical part of said plug includes:
a recess in which a lens facing an end face of said optical fiber is formed; and
two semicircular column-shaped side walls to be engaged with an optical part in said receptacle that are formed on opposite sides of said recess.

13. The receptacle according to claim 4, wherein a spring piece that biases said shutter in a direction to close said shutter is provided on said shutter.

14. An electrical-optical hybrid connector comprising a plug having an insertion fitting part and a receptacle having a housing space that receives the insertion fitting part,
wherein said receptacle is a receptacle according to claim 13, and
said plug has an optical connection part disposed at a front end of said insertion fitting part and an electrical connection part disposed behind said optical connection part.

15. The electrical-optical hybrid connector according to claim 14, wherein said plug comprises:
an insulating main body including a base part and a tongue piece extending from the base part;
a shell that surrounds said insulating main body and forms said insertion fitting part;
a terminal disposed on one planar surface of said tongue piece and exposed in a space between said one planar surface and said shell; and
an optical part to which an optical fiber is attached and which is disposed in a recess part formed on another planar surface of said tongue piece,
wherein said optical connection part of said plug includes said optical part, and
said electrical connection part of said plug includes said terminal.

16. The electrical-optical hybrid connector according to claim 15, wherein said optical part of said plug includes:
a recess in which a lens facing an end face of said optical fiber is formed; and
two semicircular column-shaped side walls to be engaged with an optical part in said receptacle that are formed on opposite sides of said recess.

17. An electrical-optical hybrid connector comprising a plug having an insertion fitting part and a receptacle having a housing space that receives the insertion fitting part,
wherein said receptacle is a receptacle according to claim 4, and said plug has an optical connection part disposed at a front end of said insertion fitting part and an electrical connection part disposed behind said optical connection part.

18. The electrical-optical hybrid connector according to claim 17, wherein said plug comprises:
    an insulating main body including a base part and a tongue piece extending from the base part;
    a shell that surrounds said insulating main body and forms said insertion fitting part;
    a terminal disposed on one planar surface of said tongue piece and exposed in a space between said one planar surface and said shell; and
    an optical part to which an optical fiber is attached and which is disposed in a recess part formed on another planar surface of said tongue piece,
    wherein said optical connection part of said plug includes said optical part, and
    said electrical connection part of said plug includes said terminal.

19. The electrical-optical hybrid connector according to claim 18, wherein said optical part of said plug includes:
    a recess in which a lens facing an end face of said optical fiber is formed; and
    two semicircular column-shaped side walls to be engaged with an optical part in said receptacle that are formed on opposite sides of said recess.

20. The receptacle according to claim 2, wherein said shutter is disposed in front of said optical part of said receptacle in a state where said plug is not connected to said receptacle,
    said optical part of said receptacle includes two column-shaped parts formed to extend toward said shutter, and
    a V-shaped groove to be engaged with an optical part in said plug is formed in an inner wall part of each of said column-shaped parts.

21. An electrical-optical hybrid connector comprising a plug having an insertion fitting part and a receptacle having a housing space that receives the insertion fitting part,
    wherein said receptacle is a receptacle according to claim 1, and
    said plug has an optical connection part disposed at a front end of said insertion fitting part and an electrical connection part disposed behind said optical connection part.

22. The electrical-optical hybrid connector according to claim 21, wherein said plug comprises:
    an insulating main body including a base part and a tongue piece extending from the base part;
    a shell that surrounds said insulating main body and forms said insertion fitting part;
    a terminal disposed on one planar surface of said tongue piece and exposed in a space between said one planar surface and said shell; and
    an optical part to which an optical fiber is attached and which is disposed in a recess part formed on another planar surface of said tongue piece,
    wherein said optical connection part of said plug includes said optical part, and
    said electrical connection part of said plug includes said terminal.

23. The electrical-optical hybrid connector according to claim 22, wherein said optical part of said plug includes:
    a recess in which a lens facing an end face of said optical fiber is formed; and
    two semicircular column-shaped side walls to be engaged with an optical part in said receptacle that are formed on opposite sides of said recess.

* * * * *